United States Patent [19]

Bauer

[11] Patent Number: 4,678,281
[45] Date of Patent: Jul. 7, 1987

[54] CIRCUIT FOR THE ACTUATION OF LIQUID CRYSTAL LAYERS IN MIRRORS

[76] Inventor: Rainer Bauer, D-6072 Dreieich, An der Dampfmühle 12, Fed. Rep. of Germany

[21] Appl. No.: 716,218

[22] Filed: Mar. 26, 1985

[30] Foreign Application Priority Data

Mar. 26, 1984 [DE] Fed. Rep. of Germany ....... 3411048

[51] Int. Cl.[4] ............................................. G02F 1/133
[52] U.S. Cl. ................................ 350/331 R; 350/278; 350/337; 350/338
[58] Field of Search ................... 350/331 R, 278, 279, 350/337, 338

[56] References Cited

U.S. PATENT DOCUMENTS

| | | | |
|---|---|---|---|
| 3,862,798 | 1/1975 | Hopkins | 350/331 R |
| 4,161,653 | 7/1979 | Bedini et al. | 350/331 R |
| 4,299,444 | 10/1981 | Romer | 350/337 |
| 4,603,946 | 8/1986 | Kato et al. | 350/279 |

FOREIGN PATENT DOCUMENTS 0070034  7/1981  European Pat. Off. ........ 350/331 R

*Primary Examiner*—John K. Corbin
*Assistant Examiner*—Martin Lerner
*Attorney, Agent, or Firm*—Robert J. Koch

[57] ABSTRACT

Circuit layout for the actuation of liquid crystal layers, formed by flip-flops (4, 5) arranged in the feeder lines of the conducting layers, with a common dimmer-IC preceding the reset inlets (R) and synchronized in a frequency dependent manner, wherein the flip-flops (4, 5) are timed synchronously, so that their preparatory inlets (4/5, 5/9) are actuated with a phase shift of 180° and the clocking inlets (4/3, 5/11) are timed with the double frequency of the preparatory inlets (4/5, 5/9). The timing means consists of an oscillator (10a) and a decoupling gate (10b), the outlets of which are connected with a frequency divider, each (8, 9) preceding the dimmer-IC (7) and the flip-flops (4, 5), of which the frequency divider (9) preceding the flip-flops (4, 5) serves as an alternator, the inverted outlets (9/1, 9/2) of which are connected with a preparatory inlet (4/5, 3/9) of the flip-flops (4, 5). The liquid crystal layer, the conducting layers arranged on transparent support layers and one of the polarizing filter layers are combined in a composite, while the other polarizing filter layer is formed in a spaced apart support.

8 Claims, 5 Drawing Figures

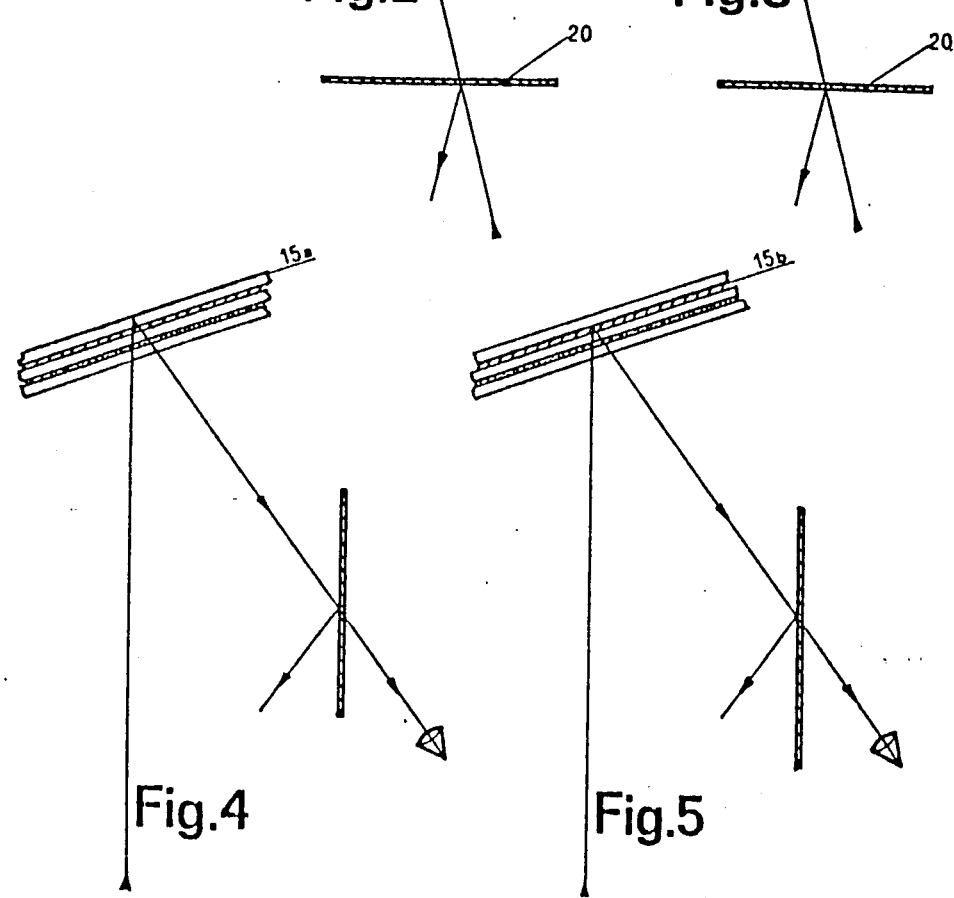

CIRCUIT FOR THE ACTUATION OF LIQUID CRYSTAL LAYERS IN MIRRORS

BACKGROUND OF THE INVENTION

1. Field of the Invention

The invention concerns a circuit for the actuation of liquid crystal layers in mirrors, windows or similar dimmable panes, consisting of two polarization filter layers arranged on transparent support layers and a liquid crystal layer bonded on both sides by conductive layers.

2. Description of the Prior Art

The older German patent application No. P 33 30 305.3 proposed a window consisting of a frame and at least one composite glass pane, wherein the composite glass pane is formed by two polarization filter panels provided on the surface facing each other with an electrically insulating coating and with an electrically actuated liquid crystal layer being included between them. Actuation in this case is effected when a pulse-width modulation electrical potential is applied to one of the conductive layers, said potential being produced by an oscillator as the frequency generator, with a frequency divider, a dimmer switch, a pulse-width modulator and a voltage limiter. The circuit proposed in the older application is not capable of satisfying practical requirements because after extended operation, degeneration phenomena appear in the liquid crystal layer, whereby the optical efficiency of the liquid crystal layer under the same electrical actuation—as viewed over a period of time—is significantly altered.

SUMMARY OF THE INVENTION

The object of the present invention is to provide a technically simple circuit for the actuation of panes dimmable or opacifiable by means of liquid layers. The liquid layers comprise two polarization filter layers arranged on transparent support layers and a liquid crystal layer bounded on both sides by conductive layers. This makes possible the continuous dimming of the panes without the occurrence of a degeneration of the liquid crystal layer, crystal orientations or other disturbances detrimentally affecting the appearance or functioning of the pane. The invention comprises forming a circuit by placing a flip-flop in the feeder lines to the conductive layers, together with a common dimmer-IC preceding the reset inlets and synchronized in a frequency dependent manner, wherein the flip-flops are synchronously cycled in a fashion such that their preparation inlets are actuated with a phase shift of 180° and the clocking inlets cycled with a double frequency.

The invention provides a circuit for the aforementioned object assuring an actuation in absolutely equal proportions of the two conductive layers and thus of the liquid crystal layer, so that unilateral electrostatic orientations of the liquid crystals and the resulting degeneration phenomena are reliably avoided. The circuit layout is simple in its design and may therefore be produced in a cost effective manner, while making possible the continuous control of the liquid crystal layer. It may be used in an essentially completely unchanged form universally, i.e., both for dimmer panes, dimmable rearview mirrors for automotive vehicles, or the like.

The timing device consists appropriately of an oscillator and a decoupling gate, the outlet of which is connected with frequency dividers preceding both the dimmer-IC and the flip-flops. The frequency divider that precede the flip-flops serves as an alternator, the inverted outlets of which are each connected with a preparatory inlet of the flip-flops. It is especially advantageous here to place a commutator between the decoupling gate and the frequency divider serving as the alternator, thus allowing the frequency divider to be connected in place of the frequency generator with the frequency divider preceding the dimmer-IC. In this manner the repeat frequency of the circuit may be adapted without problems to the prevailing gradation of the cell. Thus, in case of the steep gradation of the cell, i.e., in controlling a cell reacting to even slight voltage variations, the selector is set to 50% values by connecting the frequency dividers in series. The result is that—beginning with an initial frequency at the decoupling gate of 100 Hz and a 1:2 frequency division of the two frequency dividers—timing is effected with 50 Hz, and the repeat frequency (preparation inlets of the flip-flops) amounts to 25 Hz.

Finally, it is appropriate to connect buffer elements in series with the flip-flops, to be supplied in common by a feeder voltage control element, whereby by means of the setting of the feeder voltage for the buffer element, the output amplitude may be limited to a desirable and predetermined value.

As set forth above, the circuit according to the invention is suitable for universal application to any type of dimmable glass panes or other comparable, transparent flat structures. The circuit is particularly advantageous in rearview mirror applications. In such applications the liquid crystal layer, the conductive layers arranged on transparent support layers, and one of the polarization filter layers, are combined in a compact composite and the other polarization filter layer is formed in a support placed at a distance from the said composite. In this way the panes, i.e., the mirror on the one hand, and the remote transparent support layer on the other, appear transparent or clear when viewed directly, independently of their state of actuation, and when viewed through both supports, they appear dimmed under appropriate actuation. It is advantageous here to arrange the polarization filter layers with their polarization planes parallel to each other, with the effect that in the inactive, i.e., currentless system, the supports appear clear and transparent both to direct and indirect viewing, and dimming is present only in an actuated system.

BRIEF DESCRIPTION OF THE DRAWINGS

The invention is made more apparent by certain embodiments with reference to the drawings. In the drawings:

FIG. 2 an embodiment of an internal mirror layout dimmable by the circuit according to the invention for automotive vehicles, FIG. 3 is a further embodiment of an internal mirror assembly, FIG. 4 an embodiment of an external mirror assembly dimmable by the circuit according to the invention, for automotive vehicles, FIG. 5 another embodiment of an external mirror assembly.

DETAILED DESCRIPTION OF THE PREFERRED EMBODIMENT

Figure 1:
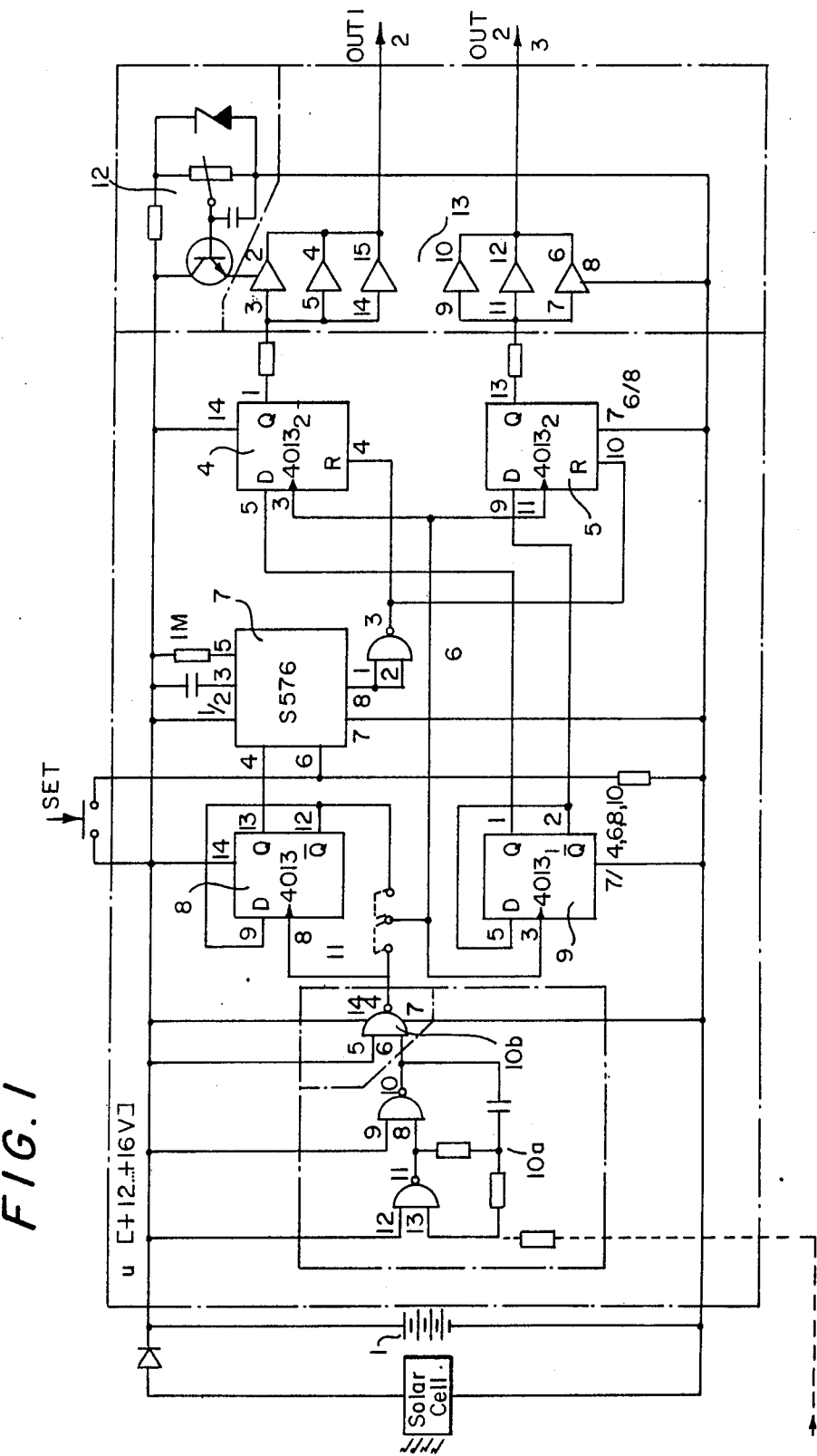
FIG. 1 shows the circuit layout according to the invention.

The drawing shows a circuit layout for the actuation of liquid crystal layers in mirrors, windows or similar dimmable panes, which—FIGS. 2 to 5—consist of two polarizing filter layers 16, 20 arranged on transparent support layers 14a, 14b and a liquid crystal layer 18 bounded on both sides by conducting layers. The circuit is formed by the flip-flops 4, 5 placed in the feeder lines to the conducting layers with a common dimmer-IC, preceding the reset inlets R and synchronized in a frequency dependent manner, with the flip-flops 4, 5 being timed synchronously so that their preparation inlets 4/5, 5/9 are actuated with a phase shift of 180° and the timing inlets 4/3, 5/11 are clocked with the double frequency of the preparation inlets 4/5, 5/9. The timing means consists of an oscillator 10a and a decoupling gate 10b, the outlet whereof is connected with one of the frequency dividers 8, 9 preceding the dimmer-IC 7 and the flip-flops 4,5. The frequency divider 9 that precedes the flip-flops 4, 5 serves as an alternator, the inverted outlets 9/1, 9/2 of which are connected with one of the preparatory inlets 4/5, 5/9 of the flip-flops 4, 5. Between the decoupling gate 10b and frequency divider 9, serving as the alternator, a commutator 11 is arranged, whereby the frequency divider 9 may be connected in series with the frequency distributor 8 preceding the dimmer-IC 7 in place of the frequency generator 10a. The flip-flops 4, 5 are followed by a buffer element 13, each of which are supplied in common by a feeder voltage control element 12.

The liquid crystal layer 18, the conducting layers arranged on transparent support layers 17, 19, and one of the polarizing filter layers 16, are combined in a compact composite—FIGS. 2 to 5—while the other polarizing filter layer 20 is formed in a spaced apart support, appropriately in the rear window or—in the case of external mirrors—in the side window. FIG. 2 shows an internal mirror of a conventional configuration with a mirror layer 15a applied behind a support layer. FIG. 3 shows a front surface mirror with a mirror layer 15b advantageously placed between the support layer 14b and the polarizing layer 16. In this manner, the number of reflecting surfaces and the corresponding risk of the appearance of double mirror images is reduced.

The circuit layout according to the invention operates as follows:

The initial state is a setting of the switch 11 whereby the timing inlets 4/3 and 5/11 of the flip-flops 4, 5 are connected directly with the decoupling gate 10b. In this position the inlets 4/3, 5/11, 8/11 and 9/3 of all of the flip-flops are actuated simultaneously with the generator frequency of 100 Hz. Furthermore, the preparation inlets (D inlets) 4/5 and 5/9 are released by the inverted Q outputs 9/1 and 9/2 of the flip-flop 9 alternatingly in the 50 Hz alternation, whereby the release takes place in each instance on the positive flank. The flip-flops 4, 5 are reset by the dimmer-IC 7, which as a function of the setting of the dimmer-IC 7 issues time delayed (negative) pulses that following inversion in the inverter 6, effect the resetting of the flip-flop 4 or 5 released. In this manner the two conducting layers of the liquid crystal layer 18—FIGS. 2 to 5—are charged with a potential with an absolute equality in time of the current phases in both of the conductive layers, so that the actuation is absolutely free of direct current.

As a function of the setting of the phase shift at the dimmer-IC, the actuation causes a more or less extensive tilting of the crystal plane of the liquid crystals. This tilting, however, is visible to an observer 21, located between the polarization filter layers 16 and 20, only when viewing the mirror through both polarizing filter layers as a more or less strong damping of the beam passage. In direct viewing through the transparent support of the polarizing layer or in mirror images outside the field of the polarized beam no changes are visible. As the reflection caused by the support of the polarizing layer 20 is located outside the mirror system, the danger of the occurrence of edge blurring of the mirror image is reduced by the spatial separation of the polarizing filter layer from the spatial assembly of the mirror. This risk may be reduced further when a front surface mirror is used in the manner shown in FIG. 3, in place of the rear surface mirror system of FIG. 2.

FIGS. 2 and 3 show the beam path in the case of an internal mirror for automotive vehicles, while FIGS. 4 and 5 display in a corresponding schematic manner the beam of an external mirror system. The drawing shows that in this case again the reflection from the carrier of the outer polarization filter layer (20) is not visible to the observer, i.e., it does not lead to edge blurring of the mirror image.

What is claimed is:

1. A dimmable composite pane comprising:
   two polarizing filter layers;
   two transparent support layers;
   a liquid crystal layer bounded on a first and a second side by conducting layers positioned between the two polarizing filter layers and arranged on the two transparent support layers;
   means for controlling the pane including first and second flip-flop means for feeding the first and second conducting layers, said flip-flop means having outputs connected to respective inputs of said conducting layers;
   dimmer means for simultaneous resetting, in a frequency dependent manner, of the flip-flop means connected to a reset input of the first and second flip-flop means;
   means for driving said flip-flop means including means for providing synchronously timed input signals such that the input signal for the first flip-flop means is 180 degrees out of phase with the input signal for the second flip-flop means and timing means for providing clock signals to said first and second flip-flop means at a rate twice the frequency of the synchronously timed input signals.

2. A dimmable composite pane as in claim 1 wherein said timing means comprises an oscillator with an output connected to a decoupling gate and the means for providing synchronously timed input signals comprises means for dividing the frequency of the clock signals, with an output connected to said dimmer means and wherein the means for dividing the frequency serves as an alternator with a noninverted output and an inverted output are connected to the first and second flip-flop means respectively.

3. A dimmable composite pane as in claim 2 wherein the means for dividing frequency comprises a first frequency divider connected to the dimmer means and a second frequency divider connected to the flip-flop means and wherein the means for driving further comprises a commutator means for connecting the first frequency divider in series with the second frequency divider, connected between the decoupling gate and the means for dividing frequency.

4. A dimmable composite pane as in claim 3 wherein the means for controlling further comprises a first and second buffer connected between the respective flip-flop means and the conducting layer, and a common means for setting an input supply or feeding voltage for the conducting layers connected to the first and second buffers.

5. A dimmable composite pane as in claim 2 wherein the means for controlling further comprises a first and second buffer connected between the respective flip-flop means and the conducting layer, and a common means for setting an input supply or feeding voltage for the conducting layers connected to the first and second buffer.

6. A dimmable composite pane as in claim 1 wherein the means for controlling further comprises a first and second buffer connected between the respective flip-flop means and the conducting layer, and a common means for setting an input supply or feeding voltage for the conducting layers connected to the first and second buffers.

7. A dimmable composite pane as in any one of of claim 1 to 6, wherein the liquid crystal, the conducting layers, the transparent support layers, and one of the polarizing filter layers are combined in a compact composite;

the other polarizing filter layer is positioned in a spaced apart fashion; and further comprising a reflective surface arranged on a transparent support layer furthest away from the spaced apart polarizing filter.

8. A dimmable composite pane as in claim 7, wherein the polarizing filter layers are positioned such that a polarizing pane of one of the polarizing filters is parallel to a polarizing plane of the other polarizing filter.

* * * * *